April 11, 1939.   W. S. WOLFRAM   2,154,117
AUTOMOBILE CLUTCH
Filed June 14, 1937   2 Sheets-Sheet 2

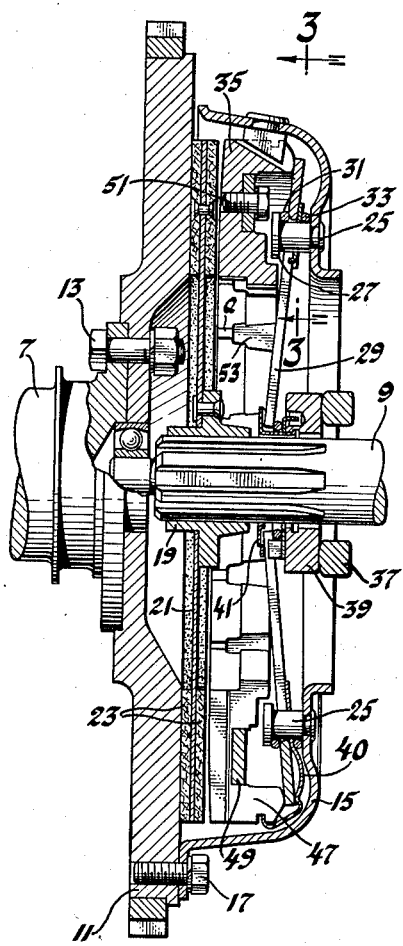
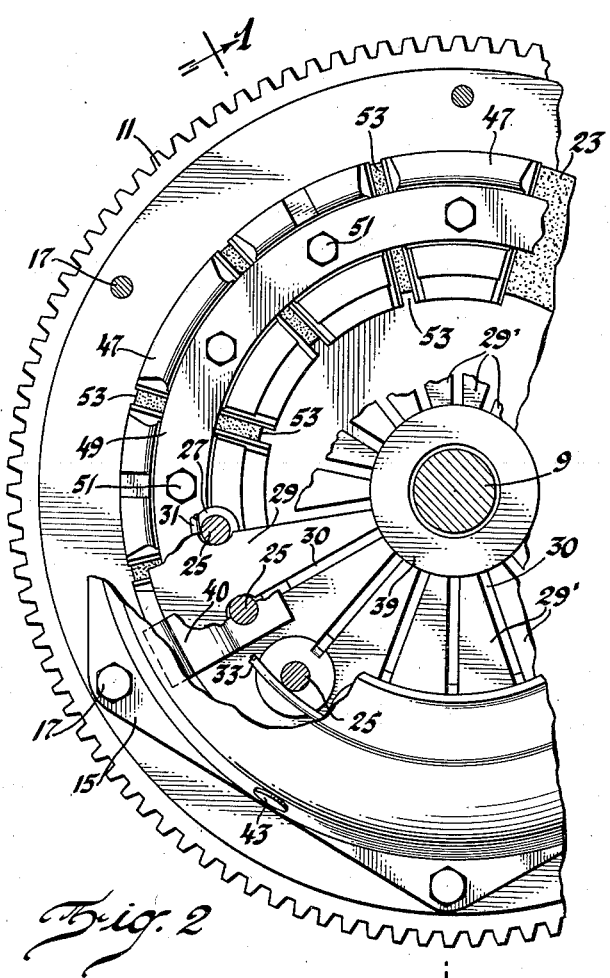
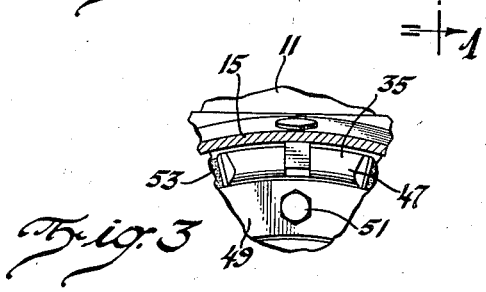

Inventor
William S. Wolfram
By Blackmore, Spencer & Flint
Attorneys

Patented Apr. 11, 1939

2,154,117

UNITED STATES PATENT OFFICE 2,154,117

AUTOMOBILE CLUTCH

William S. Wolfram, Dayton, Ohio, assignor to General Motors Corporation, Detroit, Mich., a corporation of Delaware Application June 14, 1937, Serial No. 148,096

4 Claims. (Cl. 192—68)

This invention relates to releasable friction clutches and has been designed more particularly for use on motor vehicles between the engine shaft and the input shaft of the change speed mechanism.

An object of the invention is to obtain a smooth and gradual engagement of the driving and driven members of the clutch.

Another object is the accomplishment of the major object by gradually increasing the radius of the contacting regions of the frictionally engaging parts as the clutch elements come together.

Another and more specific object is the attainment of the above objectives by means of a novel pressure plate.

Other objects and advantages will be understood from the following description.

In the drawings:

Figure 1 is a transverse section through a clutch embodying my novel pressure plate.

Figure 2 is a view in elevation, the cover being broken away to show the internal mechanism.

Figure 3 is a section on line 3—3 of Figure 1.

Figure 4:
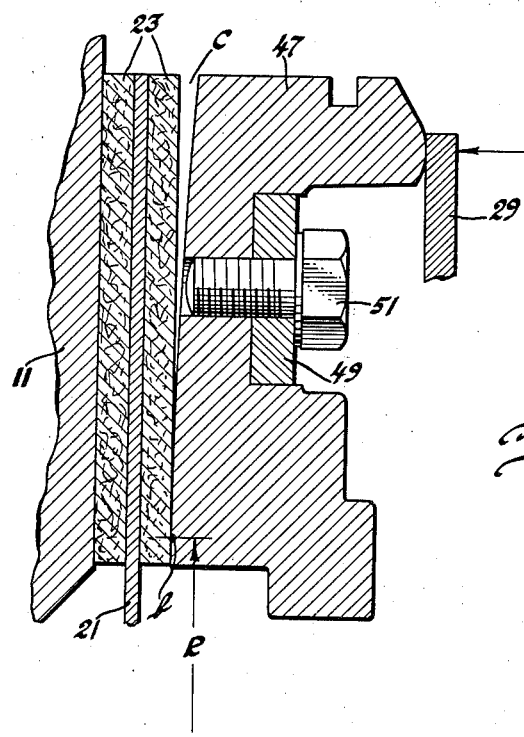
Figure 4 and Figure 5 are diagrammatic sectional views of the engaging parts in different positions of adjustment.

Referring by reference characters to the drawings, numeral 7 is used to represent an engine crankshaft and 9 is applied to the clutch driven shaft, the shaft which in a conventional construction is the input shaft of the change speed mechanism.

The flywheel 11 is secured to the crankshaft as at 13 and to the flywheel is secured a more or less conventional cover 15 by fastening means 17. Driven shaft 9 has splined thereon a hub 19 to which is riveted a driven plate 21 provided as usual with facings 23.

A circular series of fulcrum pins 25 is secured to the cover plate 15. These pins have heads 27 spaced from the cover plate. Numeral 29 is used to represent a clutch spring, the spring here shown being in the form of a Belleville disc having slots extending from its inner periphery as at 30 to thereby form fingers 29'. The clutch spring has a circular series of holes embracing the several pins 25. Two rings 31 and 33 are located, one on each side of the clutch spring 29, these rings being positioned by the pins 25 as shown in Figures 1 and 2. One of the rings 31 engages the heads 27 and the other engages the cover 15. The outer peripheral margin of the spring plate 29 engages the pressure plate designated as a whole by 35. The spring plate is normally stressed between the circular region of contact with the pressure plate and the circular region of contact with ring 33 so that the pressure plate and the flywheel grip the driven plate. The clutch may be released by any appropriate means the drawings showing a part only of a throwout lever 37. This lever or its equivalent is operable upon a collar 39 which latter engages the inner ends of the spring fingers 29'. Any suitable retaining means such as 41 may be used to secure together the radially inner ends of these fingers 29' and the collar 39. When the inner portion of the spring device is moved to the left as in Figure 1, the spring fulcrums about ring 31 and the pressure of the spring upon the pressure plate 35 is released. Any suitable device may be used to insure the movement of the pressure plate away from the driven plate when the spring pressure is released. Such an expedient is shown in Figure 1 by numeral 40 and consists of a stamping carried by pin 25 and hooked into a notch of the pressure plate.

The essential novelty of this invention is found in the structure of the pressure plate. This element may be described as made up of a circular series of segments held together by a ring. In the drawings the segments constituting the pressure plate 35 are marked by numeral 47 and the ring 49 sets in a circular recess of these segments and secures the segments together by means of cap screws 51 extending through the ring 49 and threaded into the segments. In the process of making such a pressure plate there is first provided a complete ring of cast iron. This ring is then formed with grooves 53. The grooves are cut partially but not completely through the blank so as to leave a little axial thickness, this thickness being marked by letter $a$ in Figure 1. The plate is then machined and assembled with the ring 49. Subsequent to this process the relatively thin regions at $a$ are then cut through to thereby form a plurality of independent segments. The number of such segments may vary, 12 being now considered to be desirable.

Figure 5:
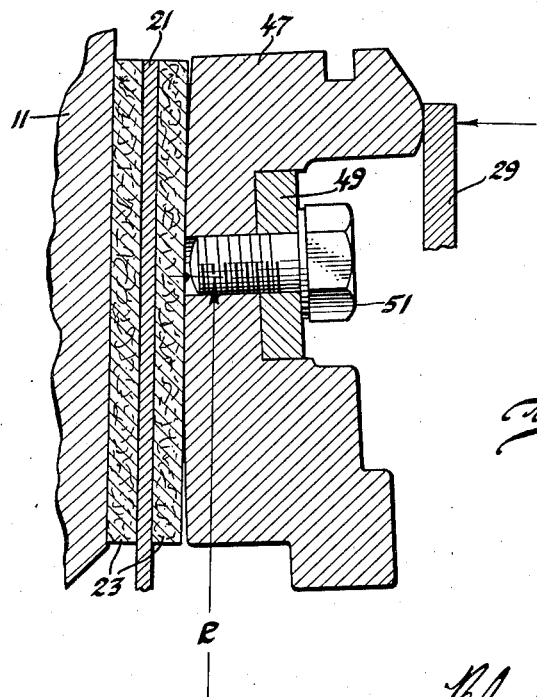

In the process of machining the side of the pressure plate adjacent the driven plate there is formed a curved surface as shown in Figure 4. This may be described as making the pressure plate surface of convex form when the clutch is in released position. The pressure plate has a minimum clearance from the driven plate at its radially inner region $b$. The clearance increases because of the curvature of the surface between the region $b$ and the region $c$ at the outer circular margin of the plate. The clearance at c between the edge of the pressure plate and the tangent to the curved surface at b is preferably but a few thousandths of an inch (not more than 60). It may be said too that it would be within the scope of the invention were the surface between b and c flat. Figure 4 is intended to represent the released position. It will be seen that when the pressure plate moves toward the flywheel the circular region at b is the first to contact the friction facing of the driven member. As additional clutch pressure is applied the several plate segments rock slightly about their neutral axes midway between their inner and outer edges until each segment assumes a position substantially like that in Figure 5 where the region of contact has extended from b to a point along the pressure plate adjacent the fastening screw 51.

Owing to the increase in radius of the effective circle of contact as the clutch engages, the action will be smooth and there will be lacking any grabbing action such as occurs in crudely designed clutches. This smooth clutch action is accomplished by the simple and inexpensive form of pressure plate described above. This pressure plate is obviously adapted for use in otherwise conventional designs.

I claim:

1. In a clutch, a flywheel, a pressure plate, a driven member therebetween, yielding means to move said pressure plate toward said flywheel, said pressure plate comprising a plurality of independent segments and means to secure said segments together, each segment having a surface with a progressively increasing clearance from the driven member in a radial direction from its inner periphery when in clutch releasing position.

2. In a clutch, a flywheel, a pressure plate, a driven member therebetween, yielding means to move said pressure plate toward said flywheel, said pressure plate comprising a plurality of independent segments and means to secure said segments together, each segment having a radially extending curvilinear surface convex in outline toward the flywheel.

3. In a clutch, a pressure plate, said plate comprising a plurality of segments, each segment having an arcuate recess between its outer and inner margins, a circular ring assembled in the recesses of said segments and means to secure each segment to said ring.

4. The invention defined by claim 3, said pressure plate having a radially curved active surface whereby the outer periphery is spaced from a radial tangent to said curved surface at the inner periphery.

WILLIAM S. WOLFRAM.